INVENTOR.
George L. Hammon
BY
Attorneys

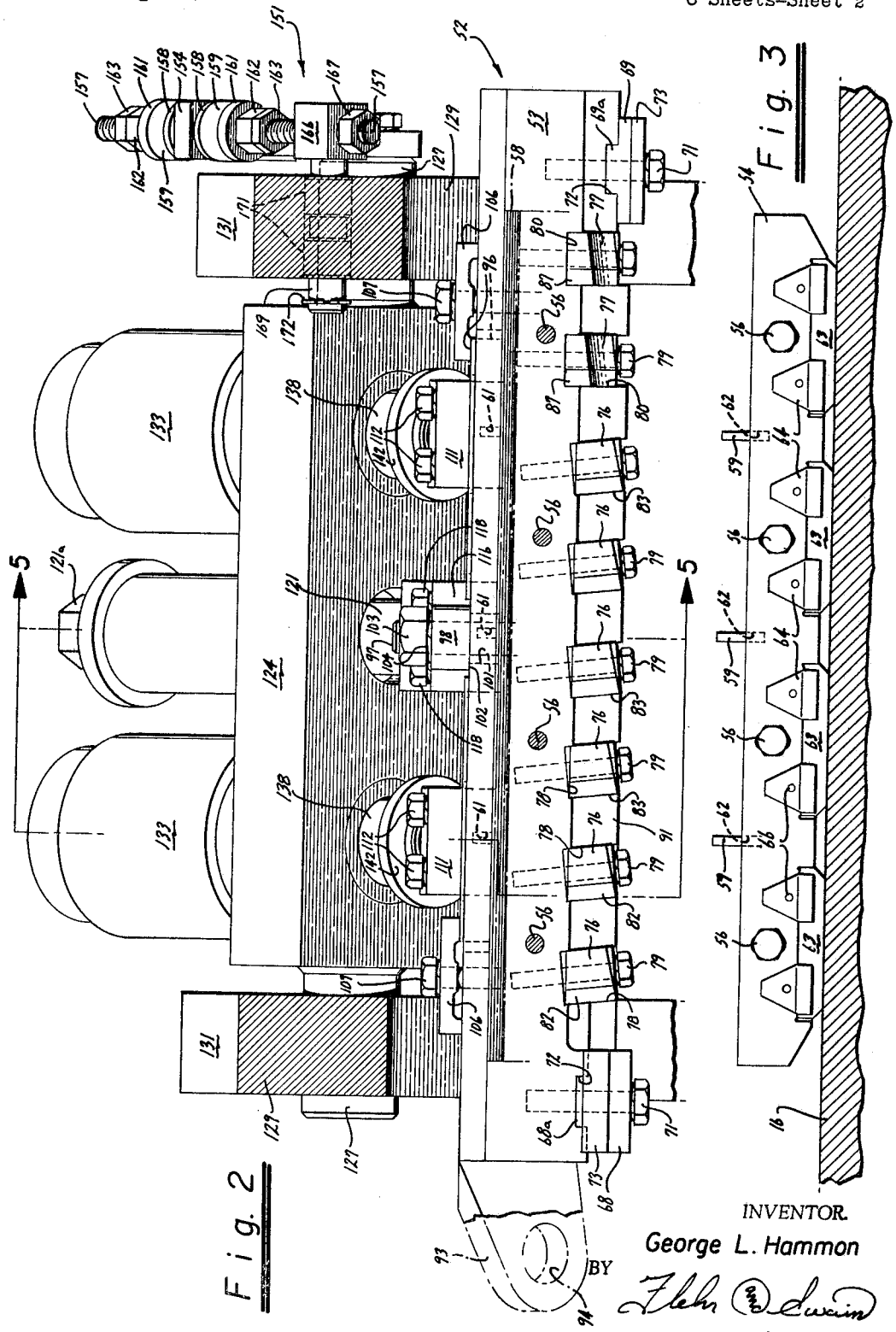

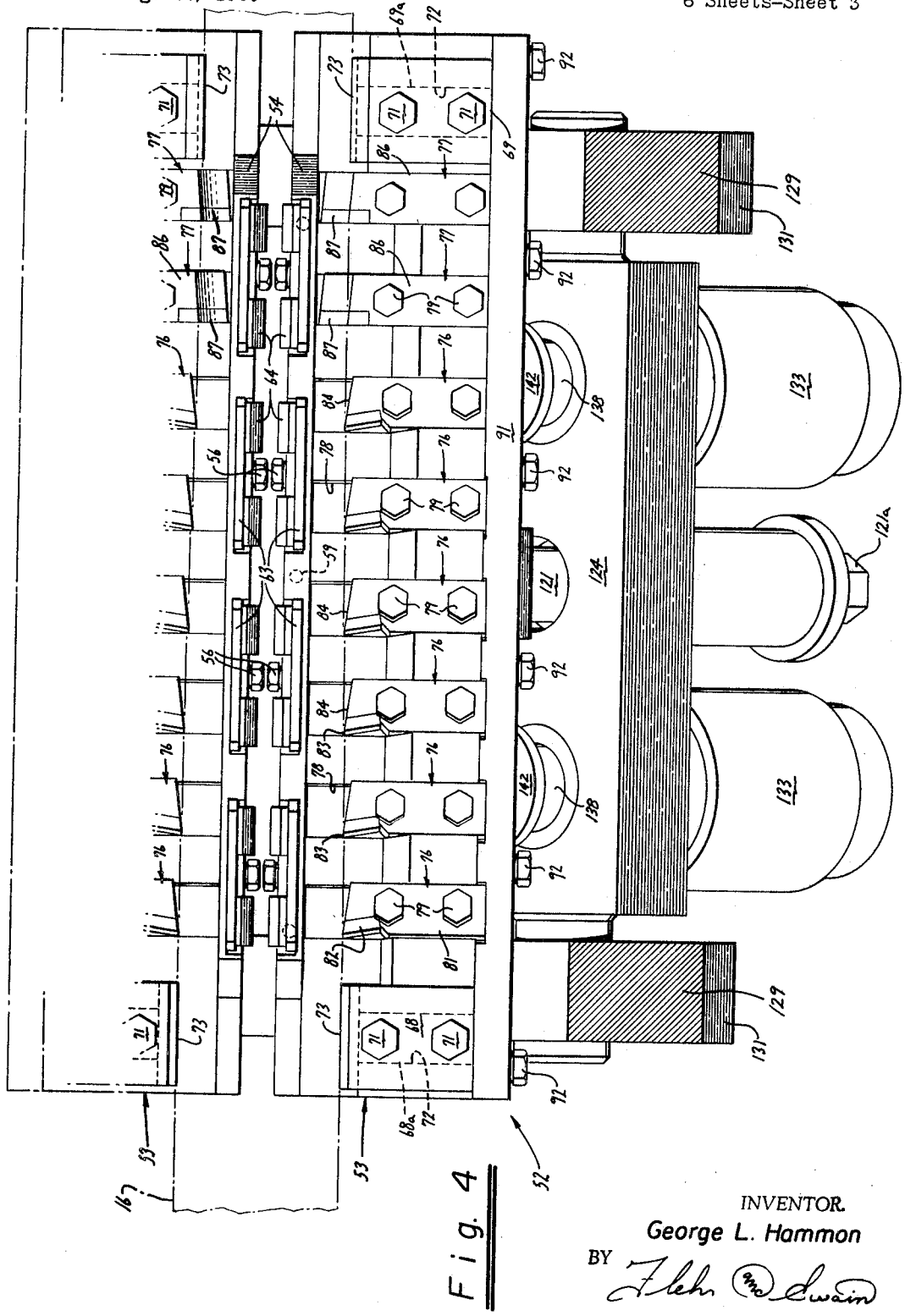

INVENTOR.
George L. Hammon
BY
Attorneys

INVENTOR.
George L. Hammon
BY
Attorneys

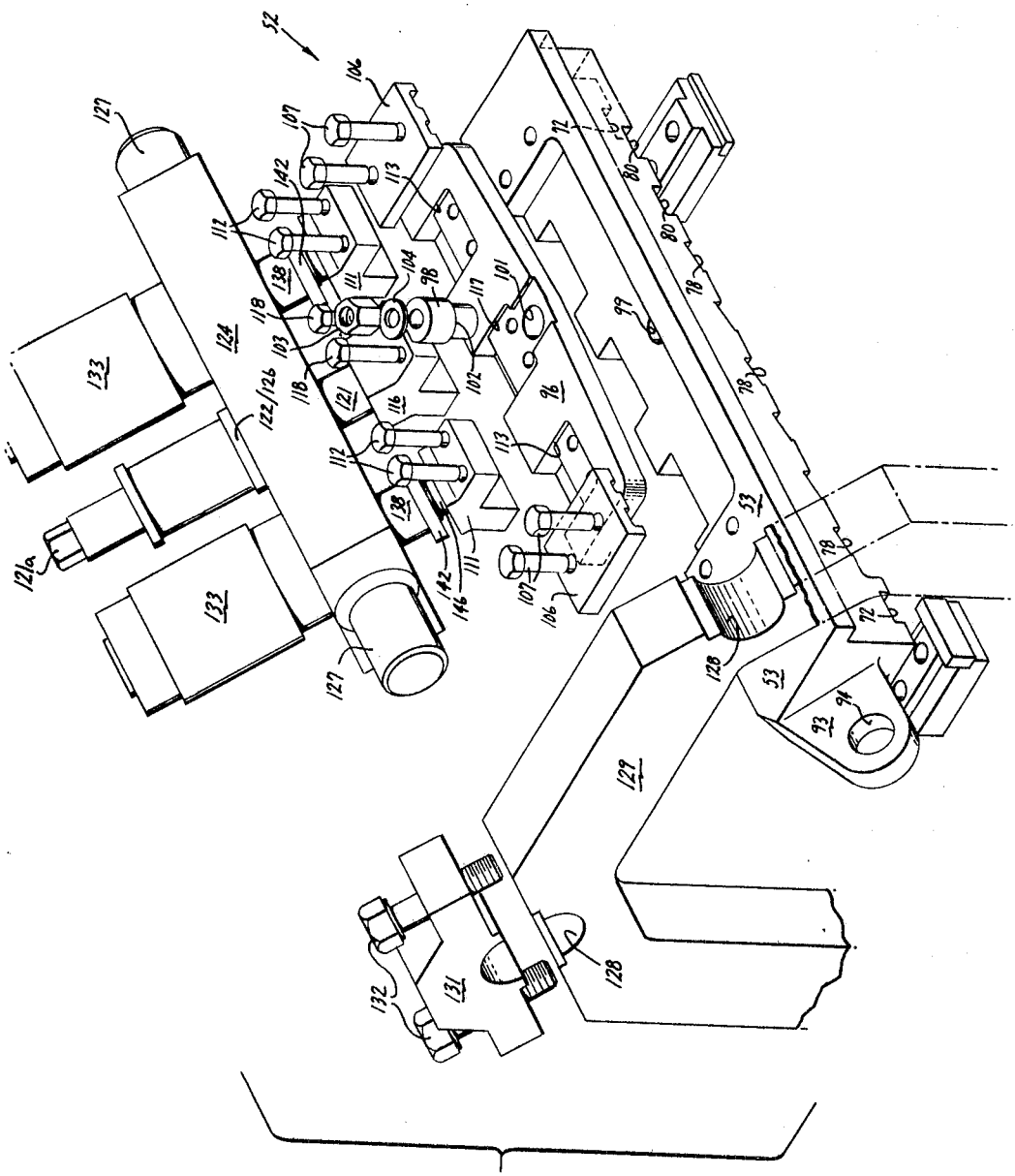

United States Patent Office 3,508,463
Patented Apr. 28, 1970

3,508,463
RAIL TRIMMING APPARATUS
George L. Hammon, Oakland, Calif., assignor, by mesne assignments, to Chemetron Corporation, Chicago, Ill., a corporation of Delaware
Filed Aug. 30, 1966, Ser. No. 576,073
Int. Cl. B23d 41/06, 1/06
U.S. Cl. 90—86                                    16 Claims

ABSTRACT OF THE DISCLOSURE

A rail trimming apparatus for trimming the head portion of a rail including a framework, a pair of elongated trimming heads on opposite sides of the head portion of the rail extending longitudinally thereof, and means mounting the trimming heads on the framework. Guide means is carried by the heads adapted to engage the rail and cutting means are mounted on each trimming head for trimming the rail. The cutting means includes a plurality of cutting tools spaced apart on the trimming head longitudinally of the rail for sequential trimming of the rail upon relative longitudinal movement thereof past each tool. Means are provided for causing relative movement between the trimming heads and the rails to cause the cutting tools carried by the trimming heads to make sequential trimming cuts upon the rail.

---

This invention relates to a rail trimming apparatus and more particularly to a rail trimming apparatus which is adapted for continuous trimming of rail.

It is well known that when rail is used and particularly when it is subject to heavy freight traffic, head flow occurs so that the head of the rail is deformed and burrs or protrusions are formed on the sides of the head of the rail. Such head flow is particularly pronounced where the rail has been used on curves. It has been found that when such used rail is removed for hardening and subsequent relocation, that the burrs or protrusions on the rail are particularly objectionable when the rail is hardened in apparatus of the type disclosed in copending application Ser. No. 355,505, filed Mar. 27, 1964. In particular, it has been found that when the head flow is pronounced, it is difficult to precisely control the hardening of the rail and in certain cases the burrs themselves may combust or burn, and thus unduly distort the hardening pattern for the rail. In view of such difficulties encountered in hardening used rail of this type, there is a need for apparatus for shaping or trimming the rail before it is hardened to remove these difficulties.

In general, it is an object of the present invention to provide a rail trimming apparatus which is particularly adaptable for removing burrs and the like from rail.

Another object of the invention is to provide apparatus of the above type which can be operated to trim rail continuously.

Another object of the invention is to provide apparatus of the above character which follows the rail as the rail is being trimmed.

Another object of the invention is to provide apparatus of the above character which can make progressive cuts at various depths in the rail.

Another object of the invention is to provide apparatus of the above character which can be readily adjusted.

Another object of the invention is to provide apparatus of the above character which is stationary and through which the rail to be trimmed is moved.

Additional objects and features of the invention will appear from the following description in which the preferred embodiment is set forth in detail in conjunction with the accompanying drawings.

Referring to the drawings:

FIGURE 2 is a side elevational view in cross-section taken along the line 2—2 of FIGURE 6 with the upper guide block and the shoes carried thereby removed showing one of the trimming heads.

FIGURE 3 is a side elevational view showing the upper guide block and the shoes carried thereby which have been removed in FIGURE 2.

FIGURE 4 is a bottom plan view of the trimming heads.

FIGURE 7 is an exploded view of a portion of the rail trimming apparatus.

Figure 1:
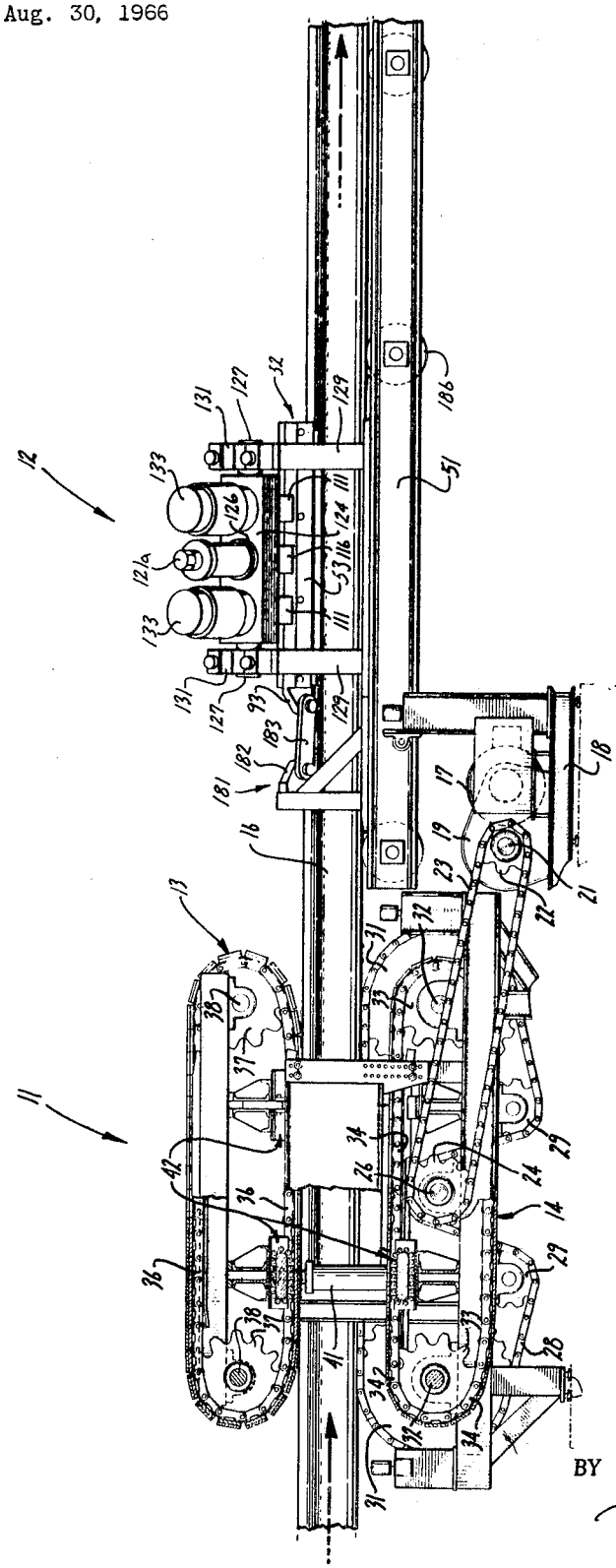
FIGURE 1 is a front elevational view of a rail trimming apparatus incorporating the present invention.

In general, the rail trimming apparatus is utilized for trimming the head portion of a rail. It consists of a framework and a pair of trimming heads. Means is provided for mounting the trimming heads on the framework. Guiding means is carried by the heads and is adapted to engage the rail. Cutting means is carried by the head and trims the head of the rail. Means is carried by the framework for applying a force to the head to urge the cutting means toward the rail to control the cut made by the cutting means.

More in particular as shown in the drawings, the rail trimming apparatus consists of an advancing assembly 11 and a trimming assembly 12. The advancing assembly 11 is substantially identical to the pusher mechanism which is disclosed in U.S. Letters Patent 3,045,886 and is comprised generally of upper and lower treads 13 and 14. The lower tread 14 is adapted to engage the underside or base of the rail 16, whereas the upper tread is adapted to engage the head or running surface of the rail 16. The upper tread 13 may be characterized as a square tread for holding the base of the rail in engagement with the lower tread 14.

The lower endless tread 14 is adapted to be driven in opposite directions by drive motor 17 mounted upon a framework 18. The motor 17 drives a speed reducer 19 which has an output shaft 21 with a sprocket 22 mounted thereon. The sprocket 22 drives a chain 23 which drives a sprocket 24 affixed to a shaft 26 rotatably mounted in the frame 18. Another sprocket (not shown) is mounted on the shaft 26 and drives a chain 28 which is looped over the top of the sprocket and then passes under a pair of idler sprockets 29 and extends in opposite directions over large sprockets 31 at opposite ends. The sprockets 31 drive a pair of spaced parallel shafts 32 rotatably mounted upon the framework 18. A pair of spaced sprockets 33 are provided on each of the shafts 32 and engage sprocket driving chains 34 to which the segmented endless lower tread 14 is secured.

The upper segmented tread 13 is similarly secured to a pair of spaced chains 36 which are driven by pairs of spaced sprockets 37 mounted upon shafts 38 rotatably carried by the framework.

The advancing assembly 11 also includes means for adjusting the upper tread 13 relative to the lower tread 14 to accommodate different sizes of rails. However, this particular portion of the mechanism will not be described in detail because it is fully disclosed in Patent No. 3,045,886. However, in general, this adjusting mechanism includes fluid actuators 41 which apply pressure to spaced endless roller assemblies 42.

The advancing assembly 11 is capable of advancing the rail 16 in either direction and is capable of developing sufficient traction so that very long rails which may reach a length as great as one-quarter of a mile may be advanced. The rail is advanced into the trimming assembly 12.

Figure 5:
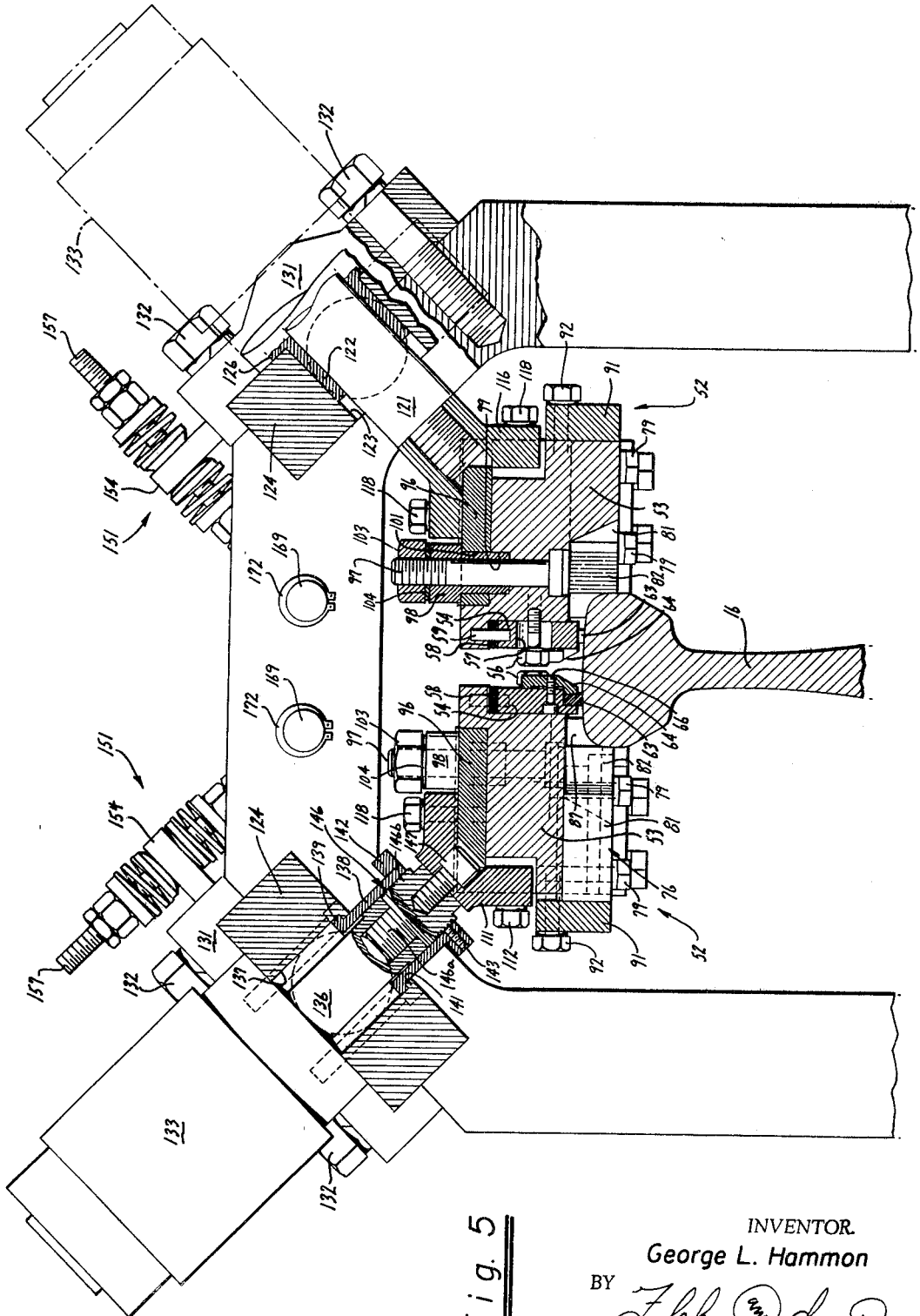
FIGURE 5 is a cross-sectional view taken generally along the line 5—5 of FIGURE 2.
Figure 6:
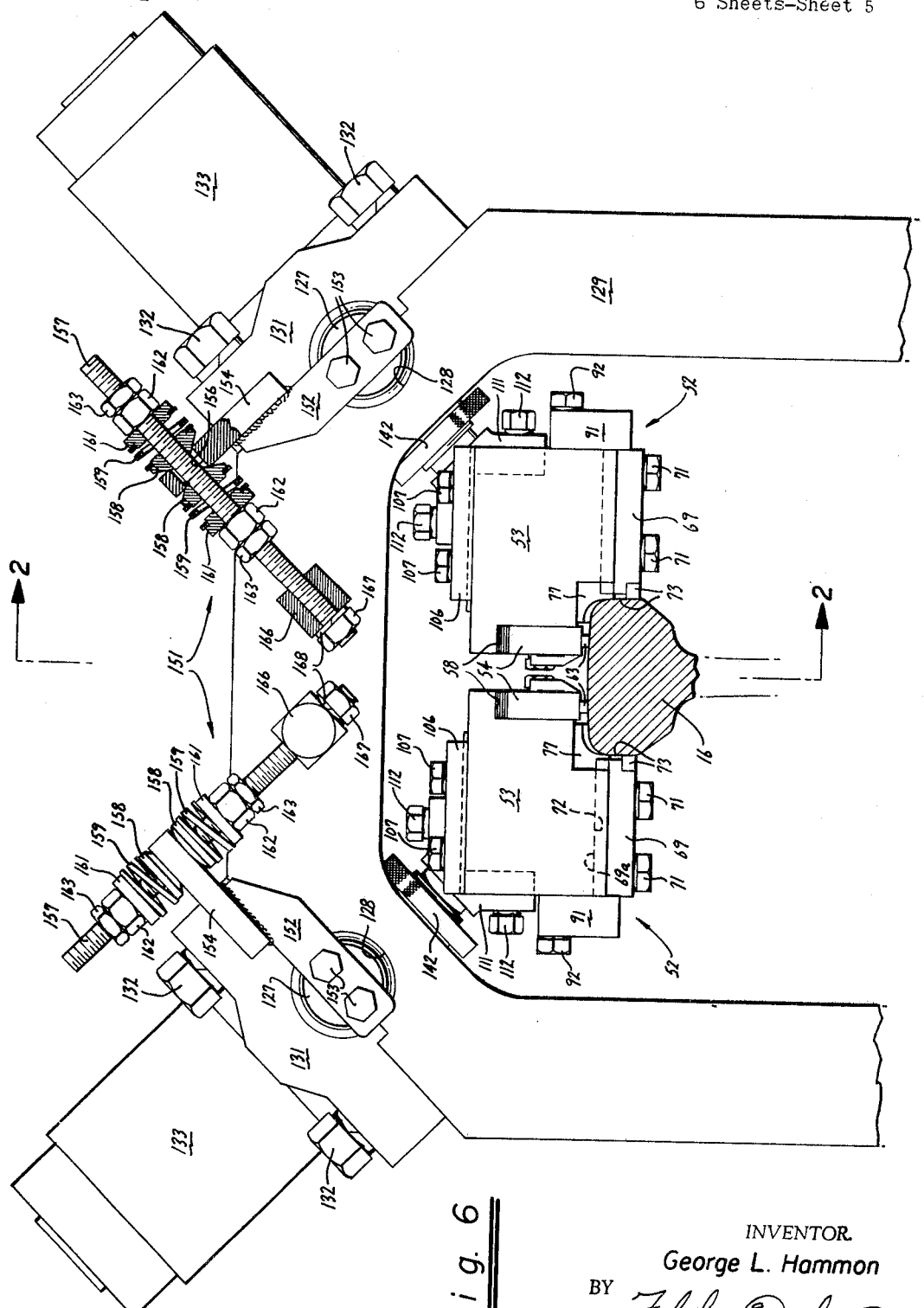
FIGURE 6 is a rear elevational view with certain parts in cross-section of the rail trimming apparatus.

The trimming assembly 12 consists of a framework 51 which may or may not be a part of the framework 18 for the advancing assembly 11. The trimming assembly 12 also consists of a pair of spaced trimming heads 52. Each of the trimming heads 52 consists of a tool block 53. Means, hereinafter described, is provided for supporting each of the trimming heads 52 so that the tool block 53 is disposed in a generally horizontal plane in a direction substantially parallel to the direction of travel of the rail relative to the trimming assembly. Means is secured to each of the tool blocks which is adapted to engage the head or running surface of the rail 16 and consists of a guide block 54 which is secured to the tool block 53 by suitable means such as cap screws 56. As shown particularly in FIGURE 5, the cap screws 56 extend through elongated slots 57 provided in the guide block 54 to permit vertical adjustment of the guide block relative to the tool block 53. Shims 58 are provided between the guide block 54 and the tool block 53 as shown in FIGURE 5 and are held in place by pins 59 which extend through the shims and have their ends disposed in holes 61 provided in the tool block 53 and holes 62 provided in the guide block 54. A plurality of guide shoes 63 are carried by each of the guide blocks 54 and are secured thereto by clamps 64 fastened to the guide block 54 by suitable means such as cap screws 66. The guide shoes 63 are formed of a suitable material such as Carboloy which is a sintered carbon.

Means is also provided for guiding the trimming heads 52 on the sides of the rail head and consists of front and rear or leading and trailing guide plates 68 and 69 which are removably secured to each of the tool blocks 53 by suitable means such as cap screws 71. As can be seen particularly from FIGURE 3, the guide plates 68 and 69 are provided with raised portions 68a and 69a, respectively, which fit in recesses 72 provided in the tool block 53 to prevent sidewise movement of the plates relative to the tool block 53. Each of the guide plates 68 and 69 is provided with a facing 73 which is adapted to engage the rail to be trimmed. This facing 73 is preferably formed of a very hard material as, for example, Carboloy.

From the foregoing, it can be seen that each of the trimming heads 52 is provided with a leading or front guide and a rear or trailing guide, and that each of the heads is also provided with four top guide shoes 63.

A plurality of cutting tools are carried by each of the tool blocks 53. As shown in FIGURE 4, these cutting tools consist of a plurality of straight cutters or tools 76 and a plurality of radius cutters 77. The cutters or tools are mounted in recesses 78 provided in the tool block 53 and are secured therein by suitable means such as a pair of cap screws 79. It will be noted that the cutters 76 and 77 are spaced apart substantially equal distances on the tool block 53. The straight cutters 76 each consist of a shank 81 and a tip 82 which is mounted upon the shank. The tip 82 is preferably formed of a relatively hard material such as Carboloy.

The cutting surface 83 of each of the tips 82 is inclined at a suitable angle such as 15° with respect to a line perpendicular to the longitudinal axis of the tool block 53 and the cutting surface 84 of the tip 82 is formed at a suitable angle such as 7° with a line parallel to the longitudinal axis of the tool block 53. It will be noted that six of the straight cutters 76 have been provided and they are mounted upon the tool block 53 so that they will take progressively deeper cuts into the side of the rail 16.

The radius cutters 77 are also formed with a shank 86 which carries a tip 87 also formed of a suitable hard material such as Carboloy. The tips 87 are radiused as can be seen from FIGURE 5 to accommodate the upper curved portions of the head of the rail and to trim this portion of the head of the rail after the sides of the head portion of the rail have been trimmed. As can be seen from FIGURE 4, two of the radius cutters 77 have been provided which follow the six straight cutters 76.

As can be seen particularly from FIGURE 2, the straight cutters or tools 76 are set at an angle from the horizontal and from the longitudinal axis of the tool block because the recesses 78 are formed at an angle in the tool block for a purpose hereinafter described, whereas the radius cutters 77 are mounted in recesses 80 which are straight with respect to the horizontal or the longitudinal axis of the tool block 53. As hereinafter explained, since the straight cutters or tools 76 are set at an angle, the cutting action of these tools serves to thrust the trimming head 52 upwardly so that the net result is to reduce the force applied by the top guide shoes 63 to the top running surface of the rail. This also makes possible excellent cutting action which is on the shear rather than in a straight plane cut. The straight cutters 76 can be set at any suitable angle as, for example, the 5° angle shown in FIGURE 2 to provide this shear cut and also to help lift the load from the top of the rail head.

A blocking bar 91 is mounted on each of the tool blocks 53 and extends longitudinally thereof and is secured thereto by suitable means such as cap screws 92. The blocking bar 91 is mounted on the back side of the tool block and serves as a block or base for the rear of the straight cutters or tools 76 and the radius cutters or tools 77. This ensures that the tools will all be in the proper cutting relationship. Each tool block 53 is provided with a forwardly extending ear 93 which is provided with a hole 94 for a purpose hereinafter described.

Means is provided for carrying each of the trimming heads 52 and causing a pressure to be applied to the trimming heads and consists of a swivel plate 96 which is pivotally secured to the tool block 53 by large swivel bolt 97 which is mounted in the tool block and extends upwardly through a large bushing 98 mounted in a recess 99 provided in the tool block and in a hole 101 provided in the swivel plate 96. As can be seen from FIGURE 5, the bushing 98 is provided with a shoulder 102 which overlies the swivel plate 96. A nut 103 and a washer 104 are provided on the bolt 97 to hold the bushing and swivel plate in place. As can be seen particularly from FIGURE 7, the swivel bolt is centrally positioned intermediate the ends of the swivel plate 96. Additional means is provided for securing the ends of the swivel plate to the tool block 53 and consists of a pair of spring plates 106 disposed on opposite ends of the swivel plate and secured to the tool block 53 by cap screws 107. The spring plate is positioned so that one portion overlies the tool block and another portion overlies the adjacent end of the swivel plate.

A plurality of brackets 111 are secured at spaced points to the swivel plate 96 by cap screws 112. The brackets 111 fit into recesses 113 formed on the swivel plate 96 to ensure that there is no relative movement between the brackets 111 and the swivel plate 96. Another centrally disposed bracket 116 is mounted in a recess 117 of each of the swivel plates 96 and is secured to the swivel plate by cap screws 118.

A large guide rod 121 is threaded into each of the brackets 116. It extends outwardly and upwardly at approximately a 45° angle with respect to the trimming head 52. A bushing 122 is mounted on the guide rod and is mounted in a hole 123 provided in a mounting beam 124. The bushing 122 is provided with flange 126 which overlies the mounting beam 124. The guide rod 121 is provided with a hex portion 121a which is adapted to be engaged by a wrench so it can be threaded into the bracket 116.

The mounting beam 124 is provided with a pair of trunnions 127 on opposite ends thereof which are pivotally mounted in recesses 128 provided in spaced parallel frame members 129 secured to the main framework 51. The frame members 129 extend in a direction which is substantially at right angles to the longitudinal axis of the trimming heads 52. The trunnions 127 are held in place by brackets 131 which are secured to the frame members 129 by cap screws 132.

Power means is provided for causing relative movement between the trimming heads 52 and the beams 124 and consists of a pair of hydraulic actuators mounted on each beam 124 on opposite sides of the guide rod 121. The hydraulic actuators 133 are of a conventional construction and are secured to the beam 124 by suitable means such as cap screws 134. Each of the hydraulic actuators is provided with a piston rod 136 which extends downwardly through a hole 137 provided in the beam 124. The piston rod 136 is slidably mounted in a stop sleeve 138 mounted in the hole 137. The stop sleeve 138 is provided with an upper flange 139 which cooperates with a shoulder 141 formed on the beam 124. A retaining ring 142 is mounted on the lower end of the sleeve 138 and is secured thereto by a setscrew 143. An adaptor 146 is provided with a smaller threaded portion 146a threaded into the end of the piston rod 136 and a larger threaded portion 146b threaded into the stop sleeve 138. The adaptor 146 is secured to the bracket 111 by a cap screw 147. From the foregoing, it can be seen that the movement of the piston rod 136 relative to the beam 124 is controlled by the stop sleeve 138 in which the flange 139 determines the outermost limit, whereas the retaining ring 143 determines the innermost limit of the piston rod.

All the cylinders 133 are mounted in a similar way. The cylinders 133 can be of any suitable size as, for example, approximately 3 inches in diameter. Pressurized fluid from 150 to 200 lbs. from a source (not shown) can be utilized for actuating the hydraulic actuators 133. As hereinafter explained, the cylinders 133 are utilized for controlling the depth of cut which is made by the trimming heads 52.

Means is provided for centering each of the trimming heads 52 and consists of a centering assembly 151 provided on the rear frame member 129 and secured to the rear ends of the mounting beams 124. Each of the centering assemblies consists of a lever 152 which is secured to the trunnion 127 of the mounting beam 124 by cap screws 153. The lever 152 is provided with a lever extension 154 which extends at right angles to the lever 152. The extension is provided with a hole 156 through which a threaded rod 157 extends. Cone-shaped washers 158 are threaded onto the rod 157 and engage opposite sides of the lever extension 154. A pair of springs 159 is mounted on the rod 157 and engages the cone-shaped washers 158. A pair of additional flat-faced washers 161 is provided on the threaded rod 157 and engages the outer ends of the springs 159. The washers 161, the springs 159 and the cone-shaped washers 158 are held in place by nuts 162 threaded onto the rod 157 and by jam nuts 163 also threaded onto the rod 157. The ends of the threaded rods 157 adjacent the frame member 129 are threaded into pivot blocks 166 and, in addition, are retained therein by nuts 167 and washers 168. The pivot block 166 is pivotally mounted in the frame member 129 by a shaft 169 which is affixed to the pivot block 156 (see FIGURE 2). The shaft 169 is mounted in bearings 171 carried by the frame member 129 and is retained therein by a Tru-arc retaining ring 172.

Additional means is provided for securing the trimming heads 52 to the framework 51 and consists of an anchor yoke assembly 181 (see FIGURE 1). As can be seen, the anchor yoke assembly is formed of structural steel members which are secured to the main frame 51. The yoke assembly 181 is provided with ears 182 which extend rearwardly. Links 183 which are pivotally connected to the ears 182 are also connected to the ears 93 formed as a part of the tool blocks 53.

The framework 51 is provided with a plurality of rollers 186 which are disposed in a generally parallel plane and are adapted to engage the base or bottom of the rail 16 as shown particularly in FIGURE 1.

Operation and use of the rail trimming apparatus may now be briefly described as follows. Let it be assumed that it is desired to trim used rails before they are hardened or before other operations are to be performed on the rails. The rails are placed in the advancing assembly 11, and forces are applied by the advancing assembly 11 to advance the rail 16 with as much force as is required to advance the rail through the trimming assembly 12 to cause a trimming operation hereinafter described to take place.

As the rail 16 is advanced into the trimming assembly 12, hydraulic fluid is applied to the hydraulic actuators 133 to cause the trimming heads 52 to move into engagement with the head of the rail and to trim the rail to a predetermined configuration to thereby remove all burrs or projections and the like from the head of the rail so that the head of the rail has the desired conformation and is clean and without burrs. The trimming heads 52 are mounted in such a manner so that cuts of various depths can be made merely by changing the pressure which is applied to the head of the rail by the hydraulic cylinders 133. The base of the rail is held in a predetermined horizontal plane by the rollers 186 and thus forces which are applied by the hydraulic actuators 133 are directly applied to the head of the rail by the cutting tools 76 and 77.

The trimming heads 52 are mounted in such a manner that no matter how deep the cut which is being made on the head of the rail, the total cut will be properly proportioned among the total number of cutting heads which are carried by the trimming head. This is because each tool block 53 is relatively free to adjust its position. First, it is pivotally connected to the links 183 which absorb substantially all the longitudinal forces which are applied by the cutting heads and permit vertical movement of the trimming heads. Second, the swivel mounting provided between each of the tool blocks 53 and the swivel plates 96 permits the cuts to be proportioned between the cutters 76 and 77 so that they are generally equal. For example, if a large burr on the rail is passing through the trimming heads, the leading edge of the tool block 53 is urged outwardly by the leading guide plates 68. The trailing edge of the tool block still remains in the same position so that, in effect, the total block is tilted outwardly so that each of the cutting tools 76 and 77 will take its larger proportional share of the cut to be made in the large burr. For example, where eight cutters are utilized as in the present embodiment, each cutter will take ⅛ of the total cut. As soon as the large burr has passed, the leading guide plates will again move inwardly to reduce the proportionate cut for the cutting tools.

Also, with this swivel mounting for the tool blocks 53, it can be seen that various pressures can be readily applied by the hydraulic actuators 133 without affecting the pivotal movement which is provided for the tool block to thereby, in effect, permit the trimming heads to follow the rail as it travels through the trimming assembly.

In the trimming of rail, the rail can be continuous or, if desired, the rails can be in sections. However, when they are in sections, it is desirable to advance them end to end so that, in effect, they appear to be continuous to the trimming assembly.

The two clamping plates 106 serve to stabilize the swivel plate 96. These spring plates 106 serve to provide a certain amount of shock resistance so that if the cutting tools carried by the tool blocks 53 should strike something which is very hard, the plates 106 will spring upwardly to provide some shock absorption to thereby prevent shattering of the tool blocks 53. Additional protection is provided for the trimming assembly by the fact that the links 183 are pivotally connected to the ears by rivets or bolts. If undue forces are applied to the trimming heads 52, these rivets or bolts will be sheared to protect the trimming assembly.

The centering assemblies 151 hereinbefore described serve to center the trimming heads so that they engage the corners of the rail head in a proper manner. The centering assemblies prevent the trimming heads from swinging out of alignment when retracted from the rail. The centering assemblies 151, therefore, give a rough adjustment for engaging the rail 16, whereas the top guide shoes 63 and the leading and trailing guide plates 68 and 69 provide the final tracking for the trimming heads.

It should be pointed out that the trailing or rear guide 69 is normally positioned at a location which is below a point at which any burr or other abnormal obstruction would be on the rail so that, in effect, it is engaging an original surface of the rail. This helps to ensure that the rail will be properly trimmed and that all burrs will be removed from the rail head. As also pointed out previously, the straight cutting tools 76 are positioned at an angle so that the cutting action of the tools provides a force which reduces the forces which must be carried by the top guide shoes 63. In addition, this positioning of the cutting tools causes a shear cut to be made rather than a planing cut.

The springs 159 on the threaded bolts 157 serve to center the lever 152 with respect to the threaded rod 157. The flange 139 on the sleeve 138 serves as a limit stop to prevent the trimming heads from going down too far in the event there is no rail travelling through the trimming assembly. Similarly, the retaining ring 143, which is adjustable longitudinally of the sleeve 138, controls the distance the trimming heads can be retracted from the rail.

It is apparent from the foregoing that there has been provided a new and improved rail trimming apparatus which is particularly adapted for trimming used rail, whether continuous or in sections, After the depth of cut has been adjusted, the operation of the trimming apparatus is substantially automatic. The proportional cutting which is utilized makes it possible to advance the rail through the trimming apparatus at relatively rapid speeds without any undue difficulties. After passing through the trimming apparatus, the rail has a cross-sectional configuration which is substantially identical to that of new rail and can be readily heat treated, butt welded and the like without any difficulty.

I claim:

1. In a rail trimming apparatus for trimming the head portion of a rail, a framework, a pair of elongated trimming heads on opposite sides of said head portion and extending longitudinally of said rail, each of said trimming heads including a tool block, means pivotally mounting each tool block to said framework, guide means including top and side guiding means mounted on each of said tool blocks, said top guiding means adapted to engage the top running surface of the rail and said side guiding means adapted to engage the side of the rail head, and cutting means carried by each trimming head for trimming the rail, said cutting means including a plurality of cutting tools mounted on each of said tool blocks and spaced apart longitudinally of said rail, said cutting tools being positioned along the path of travel of said rail to take progressively deeper cuts thereby to provide for sequential trimming of said rail on relative longitudinal movement thereof past each tool, and means for causing relative movement between the rail and the heads to cause the cutting means carried by the heads to make cuts upon the rail, comprising means mounted on said framework for engaging said rail and advancing said rail and means for holding said heads in a relatively stationary position relative to the longitudinal movement of said rail.

2. In a rail trimming apparatus for trimming the head portion of a rail, a framework, a pair of elongated trimming heads on opposite sides of said head portion and extending longitudinally of said rail, each of said trimming heads including a tool block, means mounting said trimming head on said framework, guide means carried by the heads and adapted to engage the rail, and cutting means carried by each trimming head for trimming the rail, said cutting means including a plurality of cutting tools mounted on said tool block and spaced apart longitudinally of said rail, said cutting tools being positioned along the path of travel of said rail to take progressively deeper cuts thereby to provide for sequential trimming of said rail on relative longitudinal movement thereof past each tool, power means mounted on said framework and secured to said tool blocks for causing relative movement of said tool blocks and cutting tools carried thereby relative to said framework and toward and away from the rail, said power means including for each tool block a mounting beam, means pivotally mounting said mounting beam on said framework on an axle substantially parallel to the direction of relative movement between the rail and said heads, and a guide rod secured to the tool block and mounted in said mounting beam for guiding said tool block, said power means being carried by said mounting beam, thereby causing movement of each tool block relative to its mounting beam.

3. Apparatus as in claim 2 together with centering means carried by said framework and secured to said beams for yieldably retaining said beams and the tool blocks in centered positions.

4. Apparatus as in claim 2 wherein said means for securing said guide rod to said tool block includes a swivel plate, means mounting said swivel plate on said tool block to permit swivel movement of said swivel plate relative to said tool block.

5. Apparatus as in claim 4 together with yieldable spring means securing the ends of said swivel plate to said tool block.

6. In a rail trimming apparatus for trimming the head portion of a rail, a framework, a pair of elongated trimming heads on opposite sides of said head portion and extending longitudinally of said rail, each of said trimming heads including a tool block, means for pivotally mounting each tool block to said framework, guide means carried by the heads and adapted to engage the rail, and cutting means carried by each trimming head for trimming the rail, said cutting means including a plurality of cutting tools mounted on each of said tool blocks and spaced apart longitudinally of said rail, said cutting tools being positioned along the path of travel of said rail to take progressively deeper cuts thereby to provide for sequential trimming of said rail on relative longitudinal movement thereof past each tool, and means for causing relative movement between the rail and the heads to cause the cutting means carried by the heads to make cuts upon the rail, said cutting tools on each head including a plurality of straight cutting edges and one or more radiused cutting edges, said straight cutting edges disposed at an angle with respect to the longitudinal axis of said tool block causing a resultant upward thrust on said tool block as the cutting tools engage and trim the rail head.

7. Apparatus as in claim 3 wherein said centering means includes a rod having one end secured to said framework, a lever arm rigidly secured to said beam and means for connecting said lever arm with said rod and for adjusting said lever arm longitudinally thereof.

8. Apparatus as in claim 2 together with means carried by the power actuated means for limiting the relative travel between the tool block and the mounting beam.

9. In a rail trimming apparatus for trimming the head portion of a rail, a framework, a pair of elongated trimming heads on opposite sides of said head portion and extending longitudinally of said rail, each of said trimming heads including a tool block, means for pivotally mounting each tool block to said framework, guide means carried by the heads and adapted to engage the rail, and cutting means carried by each trimming head for trimming the rail, said cutting means including a plurality of cutting tools mounted on each of said tool blocks and spaced apart longitudinally of said rail, said cutting tools being positioned along the path of travel of said rail to take progressively deeper cuts thereby to provide for sequential trimming of said rail on relative longitudinal movement thereof past each tool, and means for causing relative movement between the rail and the heads to cause the cutting means carried by the heads to make cuts upon the rail, each of said tool blocks being formed with a plurality of recesses spaced longitudinally of the tool block, said cutting tools being disposed in said recesses and being positioned in said recesses so that the cutting tools form an angle with respect to the longitudinal axis of the tool block so that as the cutting tools engage the rail head, an upward thrust is applied to the trimming heads.

10. Apparatus as in claim 2 wherein said power actuated means comprises a fluid actuator mounted on said beam having a movable piston rod, and means for connecting said piston rod to said tool block, and limit means for limiting the inward and outward travel of said piston rod in said fluid actuator.

11. In a rail trimming apparatus for trimming the head portion of rail, a framework, means engaging said rail for advancing said rail relative to said framework, a pair of trimming heads disposed on opposite sides of said rail and extending longitudinally of the rail, each of said trimming heads including a tool block, cutting tools mounted on said tool block and spaced longitudinally thereon relative to said rail, said cutting tools being mounted relative to each other for sequential trimming of said rail upon advancement of said rail past said tools, a swivel plate pivotally mounted on said tool block to permit relative movement between said tool block and said swivel plate, guide means mounted on said tool block and adapted to engage said rail, and power means mounted on said framework and secured to said swivel plate for urging said tool block toward said rail head to cause said cutting tools carried by the tool block to trim said head portion of the rail.

12. Apparatus as in claim 11 together with means for mounting said power means and the tool block carried thereby on said framework to permit pivotal movement of the same on an axis substantially parallel to the longitudinal axis of the tool block.

13. Apparatus as in claim 12 together with means secured to said means for mounting said power means for retaining the mounting means and the tool block carried thereby in a predetermined position.

14. Apparatus as in claim 12 wherein said means for mounting said power means includes a beam for each tool block, means pivotally mounting said beams on said framework to permit said pivotal movement, said power means being secured to each of said beams, and means for yieldably retaining each of said beams in a predetermined position relative to the rail being trimmed.

15. The apparatus of claim 11 including linkage means pivotally interconnecting said tool blocks and said framework for restraining longitudinal movement of said tool blocks, as said rail is advanced.

16. The apparatus of claim 15 wherein said linkage means includes shear pin means extending transversely of said rail and shearable upon excessive longitudinal force encountered between said trimming heads and said rail as said rail is trimmed.

References Cited

UNITED STATES PATENTS

| | | | |
|---|---|---|---|
| 1,318,102 | 10/1919 | Oakley | 90—86 X |
| 1,977,556 | 10/1934 | Hogue | 90—86 X |
| 3,227,851 | 1/1966 | Greenberger | 83—914 |
| 3,081,673 | 3/1963 | Ansel | 90—24.05 |
| 3,110,227 | 11/1963 | Croucher | 90—64 |
| 3,230,832 | 1/1966 | Cox | 90—15 X |
| 3,336,839 | 8/1967 | Welter | 90—24.05 |

FOREIGN PATENTS 1,374,279 8/1964 France.

GIL WEIDENFELD, Primary Examiner

U.S. Cl. X.R.

83—914; 90—24